(12) United States Patent
Miyamoto et al.

(10) Patent No.: US 11,286,210 B2
(45) Date of Patent: Mar. 29, 2022

(54) JOINED MATERIAL AND METHOD OF MANUFACTURING SAME

(71) Applicant: TOYO TANSO CO., LTD., Osaka (JP)

(72) Inventors: Yoshinari Miyamoto, Osaka (JP); Ichiro Fujita, Osaka (JP); Megumu Doi, Osaka (JP); Taihei Matsumoto, Osaka (JP); Tomoyuki Okuni, Osaka (JP); Fumishige Nakamura, Osaka (JP); Weiwu Chen, Suita (JP)

(73) Assignee: TOYO TANSO CO., LTD., Osaka (JP)

( * ) Notice: Subject to any disclaimer, the term of this patent is extended or adjusted under 35 U.S.C. 154(b) by 157 days.

(21) Appl. No.: 14/654,915

(22) PCT Filed: Jan. 30, 2014

(86) PCT No.: PCT/JP2014/052811
§ 371 (c)(1),
(2) Date: Jun. 23, 2015

(87) PCT Pub. No.: WO2014/119803
PCT Pub. Date: Aug. 7, 2014

(65) Prior Publication Data
US 2015/0344374 A1    Dec. 3, 2015

(30) Foreign Application Priority Data

Feb. 4, 2013 (JP) .............................. JP2013-019913
Feb. 4, 2013 (JP) .............................. JP2013-019914
Dec. 13, 2013 (JP) .............................. JP2013-258608

(51) Int. Cl.
*C04B 37/02* (2006.01)
*B32B 9/00* (2006.01)
(Continued)

(52) U.S. Cl.
CPC .............. *C04B 37/025* (2013.01); *B32B 7/12* (2013.01); *B32B 9/005* (2013.01); *B32B 9/007* (2013.01);
(Continued)

(58) Field of Classification Search
CPC ............ C04B 37/025; C04B 2237/363; C04B 2237/403; C04B 2237/72;
(Continued)

(56) References Cited

U.S. PATENT DOCUMENTS 4,636,434 A * 1/1987 Okamura .............. C04B 37/005
156/330
5,392,982 A * 2/1995 Li .......................... B22F 1/025
228/121
(Continued)

FOREIGN PATENT DOCUMENTS

CN 101462890 A 6/2009
JP 57-22179 A 2/1982
(Continued)

OTHER PUBLICATIONS

EPO Translation of JP H06321649 (Year: 2018).*
(Continued)

*Primary Examiner* — Michael Zhang
(74) *Attorney, Agent, or Firm* — Westerman, Hattori, Daniels & Adrian, LLP

(57) ABSTRACT

A joined material and a method of manufacturing the joined material are provided which enable a metal layer and a carbon material layer to be easily joined to each other while making the thickness of the metal layer larger and which can inhibit failure.

A joined material includes a CFC layer (3) and a tungsten layer (4) that are joined to each other. A sintered tungsten carbide layer (5), a mixed layer (6) of SiC and WC, and SiC
(Continued)

(a)

(b)

and WC (7) that have been sintered while intruding into the CFC layer (3), are formed between the CFC layer (3) and the tungsten layer (4), and these layers (3, 4, 5, 6, and 7) are joined to each other by sintering.

5 Claims, 8 Drawing Sheets

(51) Int. Cl.
    *B32B 37/06*      (2006.01)
    *B32B 9/04*      (2006.01)
    *G21B 1/13*      (2006.01)
    *B32B 27/20*      (2006.01)
    *B32B 7/12*      (2006.01)

(52) U.S. Cl.
    CPC .............. *B32B 9/041* (2013.01); *B32B 9/045* (2013.01); *B32B 27/20* (2013.01); *B32B 37/06* (2013.01); *G21B 1/13* (2013.01); *B32B 2262/106* (2013.01); *B32B 2264/107* (2013.01); *C04B 2237/083* (2013.01); *C04B 2237/363* (2013.01); *C04B 2237/385* (2013.01); *C04B 2237/403* (2013.01); *C04B 2237/404* (2013.01); *C04B 2237/704* (2013.01); *C04B 2237/706* (2013.01); *C04B 2237/708* (2013.01); *C04B 2237/72* (2013.01); *Y02E 30/10* (2013.01); *Y10T 428/24545* (2015.01)

(58) Field of Classification Search
    CPC ........ C04B 2237/708; C04B 2237/706; C04B 2237/704; C04B 2237/404; C04B 2237/385; C04B 2237/083; B32B 7/12; B32B 9/005; B32B 9/041; B32B 9/045; B32B 9/007; B32B 27/20; B32B 27/06; B32B 2262/106; B32B 2264/107; G21B 1/13; Y10T 428/24545; Y02E 30/128
    See application file for complete search history.

(56) References Cited

U.S. PATENT DOCUMENTS

| | | | | |
|---|---|---|---|---|
| 6,455,160 | B1* | 9/2002 | Hiraoka | C04B 35/522 117/20 |
| 2004/0226317 | A1* | 11/2004 | Kompalik | C30B 15/10 65/59.5 |
| 2010/0239885 | A1 | 9/2010 | Nakamura | |
| 2013/0221805 | A1* | 8/2013 | Ogura | G10K 11/02 310/334 |
| 2014/0086670 | A1* | 3/2014 | Ohkuni | B23K 35/0233 403/272 |

FOREIGN PATENT DOCUMENTS

| | | | | |
|---|---|---|---|---|
| JP | 62-36076 | A | | 2/1987 |
| JP | 62-78167 | A | | 4/1987 |
| JP | 6-128034 | A | | 5/1994 |
| JP | H06321649 | | * | 11/1994 |
| JP | 10-90453 | A | | 4/1998 |
| JP | 11-49569 | A | | 2/1999 |
| JP | 2000-313677 | A | | 11/2000 |
| JP | 2004061421 | A | * | 2/2004 |
| JP | 2007-119313 | A | | 5/2007 |
| JP | 2012-246173 | A | | 12/2012 |
| JP | 2012246172 | A | * | 12/2012 |
| WO | WO-2012144226 | A1 | * | 10/2012 ............. G10K 11/02 |
| WO | WO-2012165208 | A1 | * | 12/2012 ......... B23K 35/0233 |
| WO | 2013/172286 | A1 | | 11/2013 |

OTHER PUBLICATIONS

Espacenet Translation of JP-2004061421-A (Year: 2019).*
Carter, C. B., & Norton, M. G. (2007). Ceramic materials: science and engineering (vol. 716, p. 427-443). New York: springer. (Year : 2007).*
International Search Report dated May 13, 2014, issued in corresponding application No. PCT/JP2014/052811 (2 pages).
Extended (supplementary) European Search Report dated Sep. 19, 2016, issued in counterpart European Application No. 14746656.9. (7 pages).
Office Action dated Dec. 5, 2017, issued in counterpart Japanese Application No. 2014-559808, with English translation (9 pages).
First Examination Report dated Sep. 17, 2018, issued in counterpart Indian Patent Application No. 7123/DELNP/2015. (6 pages).

* cited by examiner

JOINED MATERIAL AND METHOD OF MANUFACTURING SAME

TECHNICAL FIELD

The present invention relates to a joined material and a method of manufacturing the same. More particularly, the invention relates to a joined material of a high-melting point metal and a carbon material, and a method of manufacturing the same.

BACKGROUND ART

Carbon materials such as CFC (carbon fiber-reinforced carbon composite material) and graphite material have the advantages that they do not melt even at a high temperature of 3000° C. or higher and that they are less likely to cause the deformation resulting from heat than metals. In view of this fact, it has been proposed to use a joined material in which a cooling pipe (of copper alloy or stainless steel) is joined to CFC or graphite, for a divertor plate of a nuclear fusion apparatus (see Patent Literature 1 listed below). However, the carbon materials have problems such as redeposition and wearing due to plasma. For this reason, the use of tungsten in place of CFC has been investigated. However, tungsten also has problems, such as heavy weight and poor machinability.

It has therefore been proposed to use a joined material in which a high-melting point metal material, such as tungsten, is joined to a carbon material. Nevertheless, it is generally difficult to join the two materials because tungsten or the like has a high melting point and the two materials have a thermal expansion difference. In view of the problems, the following two solutions have been proposed.

(1) A technique in which a high-melting point metal material is joined to a carbon material using a brazing material (see Patent Literature 2 listed below).

(2) A technique in which a tungsten layer (i.e., a high-melting point metal material layer) is formed on a surface of a carbon material by CVD (chemical vapor deposition), PVD (physical vapor deposition), or the like.

CITATION LIST

Patent Literature

[Patent Literature 1] Japanese Published Unexamined Patent Application No. 10-90453
[Patent Literature 2] Japanese Published Unexamined Patent Application No. 2000-313677

SUMMARY OF INVENTION

Technical Problem

Nevertheless, the technique described in (1) has the following problems. It is difficult to join the metal and the carbon material to each other because the metal has poor wettability with the metal. Moreover, the thermal expansion rate difference between the high-melting point metal material and the carbon material causes stress concentration, making the resulting material easier to break.

On the other hand, the technique described in (2) has a problem that the maximum thickness of tungsten layer is several hundred micrometers at greatest, and it is difficult to form a thick tungsten layer.

It is an object of the present invention to provide a novel joined material, and a method of manufacturing the joined material.

Solution to Problem

In order to accomplish the foregoing object, the present invention provides a joined material comprising a carbon material layer and a metal layer joined to each other, characterized in that: a joint layer is formed between the carbon material layer and the metal layer, the joint layer containing a sintering aid agent and a ceramic being sinterable and capable of reacting with a metal in the metal layer when being sintered; the carbon material layer, the joint layer, and the metal layer are joined to each other by sintering; the joint layer further contains a metallic compound being produced by reacting a metal contained in the metal layer and an element contained in the ceramic or in the sintering aid agent with each other; and a portion of the joint layer intrudes in a structure of the carbon material layer.

Advantageous Effects of Invention

The present invention achieves the advantageous effects that a metal layer and a carbon material layer can be easily joined to each other while a large thickness of the metal layer can be ensured, and moreover, the joined material can be made resistant to failure.

BRIEF DESCRIPTION OF DRAWINGS

FIG. 1 shows photographs of joined materials A1, A2, and Z, wherein FIG. 1(a) is an appearance photograph of the joined material A1, FIG. 1(b) is an appearance photograph of the joined material A2, and FIG. 1(c) is an appearance photograph of the joined material Z.

FIG. 3 shows SEM photographs of the joined material A1, wherein FIG. 3(a) is a photograph showing a polished surface, and FIG. 3(b) is a photograph showing a rupture surface.

FIG. 4 illustrates a manufacturing process of a joined material according to the present invention, wherein FIG. 4(a) is an illustrative view showing a state (a laminated material) in which a joining material and a metallic material are disposed on one surface of a carbon material, and FIG. 4(b) is an illustrative view showing a state (joined material) after sintering.

DESCRIPTION OF EMBODIMENTS

Figure 1:
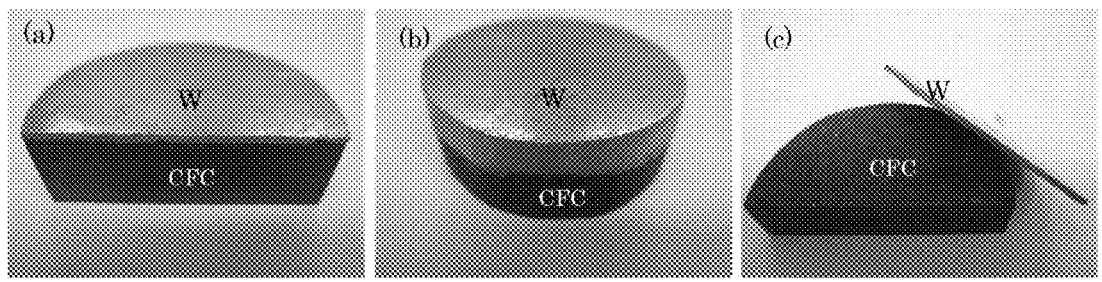

The present invention provides a joined material comprising a carbon material layer and a metal layer joined to each other, characterized in that: a joint layer is formed between the carbon material layer and the metal layer the joint layer containing a sintering aid agent and a ceramic being sinterable and capable of reacting with a metal in the metal layer when being sintered; the carbon material layer, the joint layer, and the metal layer are joined to each other by sintering the joint layer further contains a metallic compound being produced by reacting a metal contained in the metal layer and an element contained in the ceramic or in the sintering aid agent with each other; and a portion of the joint layer intrudes in a structure of the carbon material layer.

Moreover, the flexural strength of the joined material is improved. For example, when a carbon fiber composite material made of Toyo Tanso Co., Ltd [trade name: CX2002U] is used as the carbon material layer, this carbon fiber composite material has a three-point bending strength of about 47 MPa. In contrast, a joined material in which tungsten is joined to the just-mentioned carbon fiber composite material (CX2002U) (the thickness of the tungsten is about 1 mm, and the thickness of the carbon fiber composite material is 3.6 mm) has a three-point bending strength of 60 MPa when the joined material is processed into a test specimen size with a width of 3.19 mm and a thickness of 4.6 mm (the thickness of the tungsten is about 1 mm, and the thickness of the carbon fiber composite material is 3.6 mm), the carbon fiber composite material side is placed up (compressed side) while the tungsten side is placed down (tensile side), and the distance between the support points is set at 15 mm. Thus, the flexural strength is remarkably improved by joining tungsten (metal) to the carbon fiber composite material (carbon material).

It is desirable that the carbon material in the carbon material layer comprise a carbon fiber composite material, an isotropic graphite, an anisotropic graphite material, or a metal impregnated graphite material. However, these are not to be construed as limiting.

It is desirable that when SiC is used as the ceramic, the thickness of the joint layer be from 10 µm to 150 µm.

If the thickness of the joint layer is less than 10 µm, SiC does not sufficiently intrude into the carbon material layer in joining the carbon material layer and the joint layer to each other. Therefore, sufficient anchoring effect may not be obtained, and the joining may become insufficient. On the other hand, if the thickness of the joint layer exceeds 150 µm, thermal stress may increase due to the difference in linear expansion coefficient or the like, so the material may become susceptible to thermal shock or likely to develop cracks easily. Moreover, there is a risk that the heat conduction capability may become lower.

However, the thickness of the joint layer (ceramic layer) is not limited to the thickness as described above, and it may vary depending on the type of the ceramic to be used. For example, when AlN is used as the ceramic, it is desirable that the thickness of the joint layer (ceramic layer) be from 30 µm to 500 µm. In the case where AlN is used for the joining, the joining mechanism is different from the foregoing case where SiC is used for the joining, and therefore, it is preferable to restrict the thickness of the joint layer to be within the just-mentioned range. The joining mechanism using AlN is effected by infiltration of the sintering aid agent. Therefore, if the thickness of the joint layer is less than 30 µm, the amount of the sintering aid agent is too small to effect the joining. For this reason, the thickness of the joint layer is set to 30 µm or greater. Because the joining is effected by such a principle, it is desirable that the amount of the sintering aid agent contained in the source material that forms the joint layer be restricted to 3 mass % or greater, more preferably from 5 mass % to 30 mass % (when SiC is used as the ceramic, it is desirable that the amount of the sintering aid agent contained in the source material that forms the joint layer be restricted to from 3 mass % to 20 mass %). The reason why the thickness of the joint layer is restricted to 500 µm or less is to inhibit degradation of heat conduction and increase of thermal stress.

In addition, when the joined material is used as a divertor plate for a nuclear fusion reactor or the like, it is desired that the material have high heat removal capability (i.e., a high thermal conductivity coefficient) because it is used as a high heat flux device. Therefore, from the viewpoint of preventing the joint layer as an intermediate layer from becoming a barrier to heat conduction, it is preferable that the joint layer be as thin as possible. However, when the joint layer is excessively thin, the joining strength may become too poor, or the carbon in the carbon material may diffuse into the metal layer. For that reason, it is preferable that the thickness of the joint layer be from 10 µm to 500 µm, regardless of the type of the material used for the joint layer.

It is desirable that the joint layer intrude by 5 µm or more into the structure of the carbon material layer at the interface between the carbon material layer and the joint layer.

The reason is that this makes it possible to obtain sufficient anchoring effect.

It is desirable that the carbon material layer comprise a carbon fiber composite material, and the metal layer comprise tungsten.

Such a structure makes it possible to obtain the excellent properties of tungsten, such as plasma resistance, high strength, anti-dust generation, high heat conduction, and high electrical conductivity, as well as the properties of the carbon fiber composite material, such as being lightweight, heat resistance, high heat conductivity, electrical conductivity, corrosion resistance, high strength, and processability.

When the metal layer comprises tungsten and SiC is used as the ceramic, tungsten carbide is generally formed at the interface between the metal layer and the joint layer, but tungsten silicide or tungsten silicon carbide may be formed when the conditions (the thickness of the joint layer, the temperature and pressure at the time of sintering, and so forth) are varied. That is, when the metal layer comprises tungsten and SiC is used as the ceramic, at least one of tungsten carbide, tungsten silicide, and tungsten silicon carbide is formed at the interface between the metal layer and the joint layer.

It is desirable that the carbon material in the carbon material layer contain an ash content of 20 ppm or less.

By making such a restriction, it is possible to inhibit impurities from contaminating the inside of the apparatus that uses the joined material. Herein, the term "ash content" means inorganic impurities other than carbon that are left after a carbonaceous material is burned out.

It is desirable that the joined material be used for a divertor plate and/or a first wall in a nuclear fusion reactor. However, this is not to be construed as limiting.

It should be noted that when the joined material is used for a divertor plate or the like of a nuclear fusion reactor, diffusion of carbon into the metal layer under high temperature may be feared. However, in the case of SiC as described above, the problem does not arise even it is exposed for a long time as long as the temperature is 1400° C. or lower. Nevertheless, when the temperature is 1500° C. or higher, there is a risk of diffusion of carbon when it is exposed for a long time, although a short time exposure does not cause the problem. Therefore, it is preferable that the nuclear fusion reactor be designed so that the temperature of the joined material can be 1400° C. or lower.

The invention also provides a method of manufacturing a joined material, characterized by comprising: a first step of disposing a ceramic and a metal in that order on a surface of a carbon material layer, the ceramic containing a sintering aid agent and being sinterable and capable of reacting with a metal in the metal layer, to prepare a laminated material; and a second step of sintering the laminated material to cause a joint layer to intrude into the carbon material layer, the joint layer containing the ceramic, the sintering aid agent, and a metal carbide produced by reacting the carbon in the carbon material layer with the metal, whereby the carbon material layer and the metal layer are joined to each other.

This method makes it possible to manufacture the above-described joined material.

When the ceramic containing a sintering aid agent is disposed on the surface of the carbon material layer in the first step, it is possible to dispose a mixture powder comprising the ceramic and the sintering aid agent on the surface of the carbon material layer. However, it is also possible that a tape-shaped material prepared by mixing the mixture powder of the ceramic and the sintering aid agent with an organic binder, a plasticizer, and a solvent and rolling the resultant mixture into a tape shape, be disposed on the surface of the carbon material layer. When the tape-shaped material is used, it is possible to vary the content of the ceramic or that of the sintering aid agent across the thickness (i.e., grading is possible). As a result, it is possible to alleviate the thermal stress between the carbon material layer and the joint layer and the thermal stress between the joint layer and the metal layer, so it is possible to prevent the joined material from breakage further. In addition, the metal may be one in powder form, or in a plate shape.

The present invention also provides a joined material comprising a carbon fiber composite material layer and a tungsten layer joined to each other, characterized in that: a joint layer containing a ceramic comprising SiC and a sintering aid agent comprising $Y_2O_3$ and $Al_2O_3$ is formed between the carbon fiber composite material layer and the tungsten layer; the carbon fiber composite material layer, the joint layer, and the tungsten layer are joined to each other by sintering; and the joint layer comprises at least one of tungsten carbide, tungsten silicide, and tungsten silicon carbide that are produced by reacting the tungsten contained in the tungsten layer.

When the carbon fiber composite material layer, the joint layer containing a ceramic and a sintering aid agent, and the tungsten layer are joined to each other by sintering, the carbon fiber composite material layer and the tungsten layer can be firmly joined. As a result, cracks, peeling, and the like are prevented from occurring at the joint interface between the carbon fiber composite material layer and the tungsten layer. In addition, because sintering is used to join the layers, the thickness of the tungsten layer can be made larger, and moreover, the joining between the tungsten layer and the carbon fiber composite material layer can be carried out easily. Moreover, due to the presence of the joint layer containing the ceramic, carbon in the carbon fiber composite material layer is prevented from being diffused into the tungsten layer. As a result, the joining strength can be kept for a long period of time.

In addition, the flexural strength of the joined material is improved for the same reasons as stated above. Also, it is possible to obtain the excellent properties of tungsten, such as plasma resistance, high strength, anti-dust generation, high heat conduction, and high electrical conductivity, as well as the properties of the carbon fiber composite material, such as being lightweight, heat resistance, high heat conductivity, electrical conductivity, corrosion resistance, high strength, and processability.

The invention also provides a method of manufacturing a joined material, characterized by comprising: a first step of disposing a mixture comprising a ceramic and a sintering aid agent on a surface of a carbon fiber composite material layer, the ceramic comprising SiC and the sintering aid agent comprising $Y_2O_3$ and $Al_2O_3$, and disposing tungsten on the mixture, to prepare a laminated material; and a second step of sintering the laminated material to join the carbon fiber composite material layer and a tungsten layer to each other by a joint layer containing the sintering aid agent and the ceramic.

Other Embodiments (1) The ceramic in the joint layer is not limited to the above-mentioned SiC and AlN. It is also possible to use TiC, ZrC, $B_4C$, TaC, and HfC, for example.

Examples of the sintering aid agent that can be used in the joint layer include oxides such as $Y_2O_3$, $Al_2O_3$, $SiO_2$, $La_2O_3$, $CeO_2$, $Sm_2O_3$, $Yb_2O_3$, and $Lu_2O_3$, either used alone or mixture powder materials thereof. The above-described sintering aid agent helps the sintering of the joint layer, and also, it moves to the carbon material layer side at the time of sintering, serving to join the joint layer and the carbon material layer to each other.

(2) In the method of manufacturing a joined material of the present invention, the sintering temperature may sometimes become 1700° C. or higher, so it is generally desirable that the metal of the metal layer be a metal having a high-melting point. Specifically, it is possible to use molybdenum (Mo), Tantalum (Ta), Zirconium (Zr), Vanadium (V), and alloys thereof, other than the foregoing tungsten (W). It is also possible to use beryllium (Be) and beryllia (BeO). It is desirable that the melting point of the metal be 1700° C. or higher, more preferably 2000° C. or higher, and still more preferably 2400° C. or higher.

The shape of the raw material of the metal that forms the metal layer (i.e., the shape thereof before sintering) may be any of powder, pellet, foil, or plate shape, and it is possible to combine these shapes.

Furthermore, the metal layer can be formed into any thickness equal to or greater than 0.1 mm. When the joined material is used as a divertor plate or the like, it is preferable that the thickness of the metal layer be from 1 mm to 100 mm, more preferably from 3 mm to 50 mm, and still more preferably from 5 mm to 20 mm. The lower limit of the thickness is restricted as described above because melting by disruption and wearing by sputtering are taken into consideration.

(3) The thickness of the carbon material layer is not limited, but may preferably be restricted to 50 mm or less, taking heat conduction capability and the like into consideration. In addition, when a CFC material is used as the carbon material layer, it is necessary to take the anisotropy of the CFC material into consideration.

(4) When the joined material is used for a divertor plate or the like, it is necessary that the joined material satisfy the following requirements.

(a) The joined material should have excellent heat removal capability (i.e., a high thermal conductivity coefficient).

(b) The joined material should have sufficient strength against the thermal shock at the time when disruption occurs.

(c) The joined material should have sufficient strength against the electromagnetic force at the time when disruption occurs.

(d) The heat removal capability of the joint layer and the metal layer does not change against the repeated heat loads of several thousand times, or desirably 10000 to 20000 times.

(e) The joined material should be capable of repair.

(f) The amount of the material that is activated is small, or the half-life is short even if it is activated.

For example, the joined material having the following configuration meets the just-mentioned requirements.

The use of a carbon fiber composite material having a higher heat conduction capability than tungsten can satisfy the condition (a). Increasing the heat removal capability can alleviate the thermal shock, and can satisfy the condition (b).

The use of a carbon fiber composite material as the carbon material layer can satisfy the condition (c).

When the joined material of the present invention is used for a divertor plate or the like, the entire divertor plate or the like is not formed by the metal such as tungsten (that is, the thickness of the tungsten or the like becomes thinner, so the amount of tungsten or the like used decreases). Therefore, the condition (f) can be satisfied. Moreover, because the entire divertor plate or the like is not formed by the metal such as tungsten, the condition (e) can also be satisfied.

(5) When the joined material is used for a divertor plate or the like, it is particularly desirable to use SiC and AlN as a ceramic and also to use $Y_2O_3$ and $Al_2O_3$ as the sintering aid agent. When taking the recrystallization temperature of tungsten into consideration, the joined material is used while the maximum temperature at the surface of the divertor plate or the like is controlled to be about 1400-1600° C. So, the reason is to prevent the joint layer from melting due to the temperature or becoming brittle due to structural change, although the temperature of the joined part is lower than that (600-1200° C.).

When the joined material is used for a divertor plate or the like, it is preferable to use a material that has high heat resistance and is not activated, or in such an amount that the adverse effect is not significant. The above-described joint layer satisfies this requirement. Note that the material that is not activated is preferable for the following two reasons.

(a) If the material is activated, it needs to be set aside until the radioactivity lowers in order to carry out the maintenance safely.

(b) Because of the nuclear transformation associated with activation, the thermal and mechanical properties of the material may change, and at the same time, the material may change into a harmful substance. Also, the damages to the material resulting from α particle emission and the strength deterioration resulting from bubble formation may be caused.

(6) When it is necessary to make a connection with a cooling mechanism such as cooling pipes, that is made of a copper alloy or a stainless steel, the configuration of the present invention allows the carbon material layer, which has a lower young's modulus than the copper alloy and the stainless steel, to be disposed between the metal layer and the cooling mechanism. Therefore, the thermal stress can be alleviated further, and as a result, it becomes possible to use the joined material under a condition in which the temperature is even higher.

Embodiments

First Embodiment

Example 1

0.25 g of SiC (containing $Y_2O_3$ and $Al_2O_3$, serving as the sintering aid agent, the proportions of which are respectively 3 mass % and 6 mass % relative to SiC) and 25 g of tungsten powder were disposed in that order on a CFC layer (carbon fiber composite material made of Toyo Tanso Co., Ltd [trade name: CX2002U] having a diameter of 40 mm, a thickness of 10 mm, and an ash content of 5 ppm), to thereby prepare a laminated material. Next, the laminated material was sintered under vacuum for 5 minutes by pulse current sintering using a SPS technique (spark plasma sintering technique) under the conditions of a temperature of 1800° C. and a pressure of 30 MPa, to prepare a joined material.

The joined material prepared in this manner is hereinafter referred to as a joined material A1.

Example 2

A joined material was fabricated in the same manner as described in Example 1 above, except that the amount of the tungsten powder was set at 125 g.

The joined material prepared in this manner is hereinafter referred to as a joined material A2.

Example 3

A joined material was fabricated in the same manner as described in Example 1 above, except that the amount of the tungsten powder was set at 50 g.

The joined material prepared in this manner is hereinafter referred to as a joined material A3.

Comparative Example

A joined material was fabricated in the same manner as described in Example 1 above, except that the tungsten powder was disposed directly on the CFC layer (i.e., no SiC was disposed).

The joined material prepared in this manner is hereinafter referred to as a joined material Z.

(Experiment)

The thickness of the CFC layer, the thickness of the tungsten layer, and the thickness of the joint layer (intermediate layer) comprising SiC as its main component were determined for each of the joined materials A1 to A3 and Z. The results are shown in Table 1. In addition, each of the joined materials A1 to A3 and Z were polished and ruptured to observe whether or not the tungsten layer was peeled from the CFC layer in the middle of the polishing and rupturing. The results are also shown in Table 1. Also, the photographs of the joined materials A1, A2, and Z after polished and ruptured are shown in FIGS. 1(a) to 1(c). Note that FIG. 1(a) is a photograph of the joined material A1, FIG. 1(b) is a photograph of the joined material A2, and FIG. 1(c) is a photograph of the joined material Z.

TABLE 1

| | Thickness of CFC layer (mm) | Thickness of tungsten layer (mm) | Joint layer | | |
| --- | --- | --- | --- | --- | --- |
| | | | | Thickness (mm) | Whether tungsten layer was peeled |
| A1 | 10 | 1 | Present | 0.12 | Not peeled |
| A2 | 10 | 5 | Present | 0.12 | Not peeled |
| A3 | 10 | 2 | Present | 0.12 | Not peeled |
| Z | 10 | 1 | Absent | — | Peeled |

As clearly seen from Table 1 and FIGS. 1(a) to 1(c), the joined material Z, which does not have the joint layer, showed that peeling of the tungsten layer occurred during the polishing and rupturing. In contrast, the joined materials A1 to A3, which have a joint layer, showed that peeling of the tungsten layer did not occur even after the polishing and rupturing.

Figure 2:
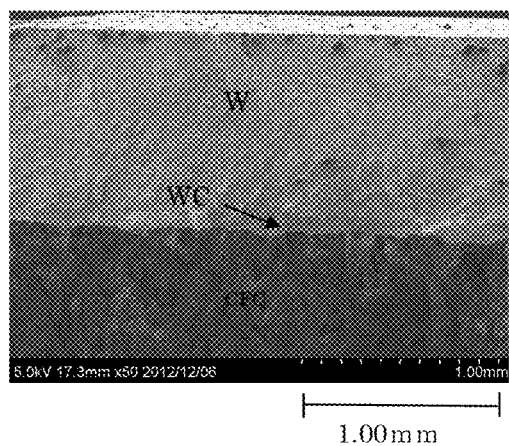
FIG. 2 is a photograph illustrating a rupture surface in the joined material A1.
Figure 3:
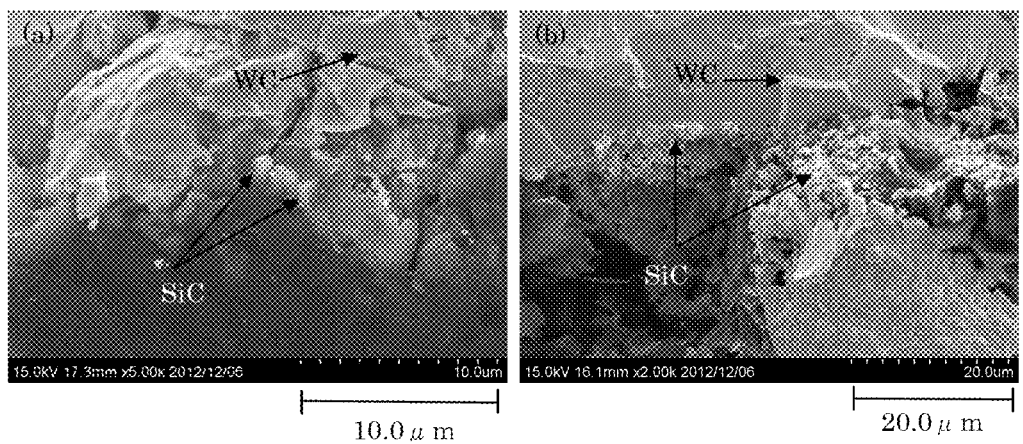

When the rupture surface of the joined material A1 was investigated, it was observed that WC (tungsten carbide) was formed between the tungsten layer and the CFC layer, as shown in FIG. 2. Accordingly, the polished surface and the rupture surface in the joined material A1 was investigated further. As a result, it was confirmed that, as illustrated in FIGS. 3(a) and 3(b), WC (tungsten carbide) was formed in the tungsten layer near the boundary between the tungsten layer and the joint layer containing SiC as its main component.

From these photographs, the structure of the joined material A1 will be described with reference to FIGS. 4(a) and 4(b). FIG. 4(a) is an illustrative view showing the laminated material before sintering, and FIG. 4(b) is an illustrative view showing the joined material after sintering. When a laminated material [see FIG. 4(a)] in which SiC powder 2 containing a sintering aid agent and tungsten powder 1 are disposed on a CFC layer 3 is sintered, the joined material as shown in FIG. 4(b) can be obtained. In the joined material, reference numeral 4 denotes a tungsten layer (W layer), reference numeral 5 denotes a sintered tungsten carbide layer (WC layer), reference numeral 6 denotes a mixed layer of SiC and WC (hereinafter also referred to as a "SiC-WC mixed layer", and note that a grain boundary layer between $Y_2O_3$ and $Al_2O_3$ exists around SiC particles), and reference numeral 7 denotes SiC and WC that have been sintered while intruding into the CFC layer 3 (the intrusion amount was 10 μm). Note that the tungsten carbide layer 5 does not fully consist of tungsten carbide, but contains metallic tungsten that has not reacted with carbon.

Here, the joining principle of the tungsten layer 4 and the CFC layer 3 will be described. When the above-described laminated material is compressed and heated at an appropriate pressure and an appropriate temperature, part of the SiC and the tungsten powder intrudes into the gaps between the carbon fiber bundles in the CFC layer 3 by the compression before sintering. Next, sintering causes the aid agent such as $Y_2O_3$ and $Al_2O_3$ to melt, resulting in grain growth of SiC. In addition, heating causes tungsten and carbon to react with each other, resulting in formation of tungsten carbide (WC). Then, compression causes the grown SiC particles and the grown WC particles to intrude further into the gaps and fibers of the CFC. As a result, sufficient anchoring effect can be obtained.

On the other hand, the tungsten layer 4 and the SiC-WC mixed layer 6 are joined together because the tungsten carbide layer 5 is formed and also a Y—Al—Si—O phase that is formed with the melting of the sintering aid agent is entangled with WC and SiC.

That is, it is believed that the joining between the SiC-WC mixed layer 6 and the CFC layer 3 is mainly caused by a physical anchoring effect, and the joining between the tungsten layer 4 and the SiC-WC mixed layer 6 is caused by chemical bonding. Thus, each of the interfaces is firmly joined by physical joining and chemical joining.

The thickness of the tungsten carbide layer 5 of the joined material A1 is 80 μm, but when the thickness of the tungsten carbide layer 5 is too great (equal to or greater than 200 μm), there is a risk that the joined material may become susceptible to thermal shock or may have poor heat conduction. For this reason, when the joined material is used for an apparatus and the temperature rises (note that the temperature at this time is about 600-1000° C. lower than the temperature at the time of sintering), it is necessary to prevent the carbon in the CFC layer 3 from diffusing into the tungsten layer 4. However, when the SiC-WC mixed layer 6 exists between the CFC layer 3 and the tungsten layer 4 as in the foregoing configuration, it is possible to prevent the carbon in the CFC layer 3 from diffusing into the tungsten layer 4.

The reason why the tungsten layer 4 and the CFC layer 3 are not firmly joined to each other when the tungsten layer 4 and the CFC layer 3 are directly joined to each other without providing the SiC-WC mixed layer 6, as in the foregoing joined material Z, is not clear. However, it is believed that the reason is that the tungsten carbide (WC) particles are grown large and sufficient anchoring effect cannot be obtained. So, because the tungsten layer 4 and the CFC layer 3 cannot be firmly joined to each other, it is believed that the peeling of the tungsten layer 4 occurred during polishing and rupturing.

On the other hand, it is believed that, because the CFC layer 3 and the tungsten layer 4 are sufficiently joined to each other at the joint interface in the joined materials A1 and A2, the strength at the joint interface between the CFC layer 3 and the tungsten layer 4 becomes higher than that of the CFC layer 3 itself.

Second Embodiment

Example 1

A joined material was fabricated in the same manner as described in Example 1 of the first embodiment above, except that an isotropic graphite material (IG-12 made by Toyo Tanso Co., Ltd., with an open pore rate of about 16%) having a diameter of 25 mm and a thickness of 4 mm was used in place of the CFC layer, that SiC and the tungsten powder were disposed on both sides of the isotropic graphite material, and that the temperature at the time of sintering was set at 1700° C.

The joined material prepared in this manner is hereinafter referred to as a joined material B1.

Figure 5:
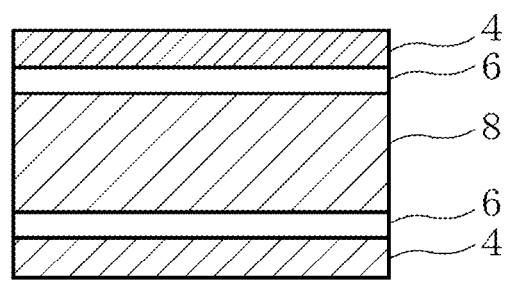
FIG. 5 is a schematic configuration view illustrating a joined material B1.

The outline of the structure of the joined material B1 is as follows. As illustrated in FIG. 5, the intermediate layer 6 containing the elements W, Si, and C is formed on each of the upper and lower surfaces of the isotropic graphite material 8, and the tungsten layer 4 is further formed on each of the outer sides of the mixed layers 6.

Example 2

A joined material was fabricated in the same manner as described in Example 2 of the first embodiment above, except that the temperature at the time of sintering was set at 1800° C.

The joined material prepared in this manner is hereinafter referred to as a joined material B2.

Example 3

A joined material was fabricated in the same manner as described in Example 2 of the first embodiment above, except that the temperature at the time of sintering was set at 1900° C.

The joined material prepared in this manner is hereinafter referred to as a joined material B3.

Example 4

A joined material was fabricated in the same manner as described in Example 2 of the first embodiment above, except that the temperature at the time of sintering was set at 2000° C.

The joined material prepared in this manner is hereinafter referred to as a joined material B4.

(Experiment 1)

Figure 6:
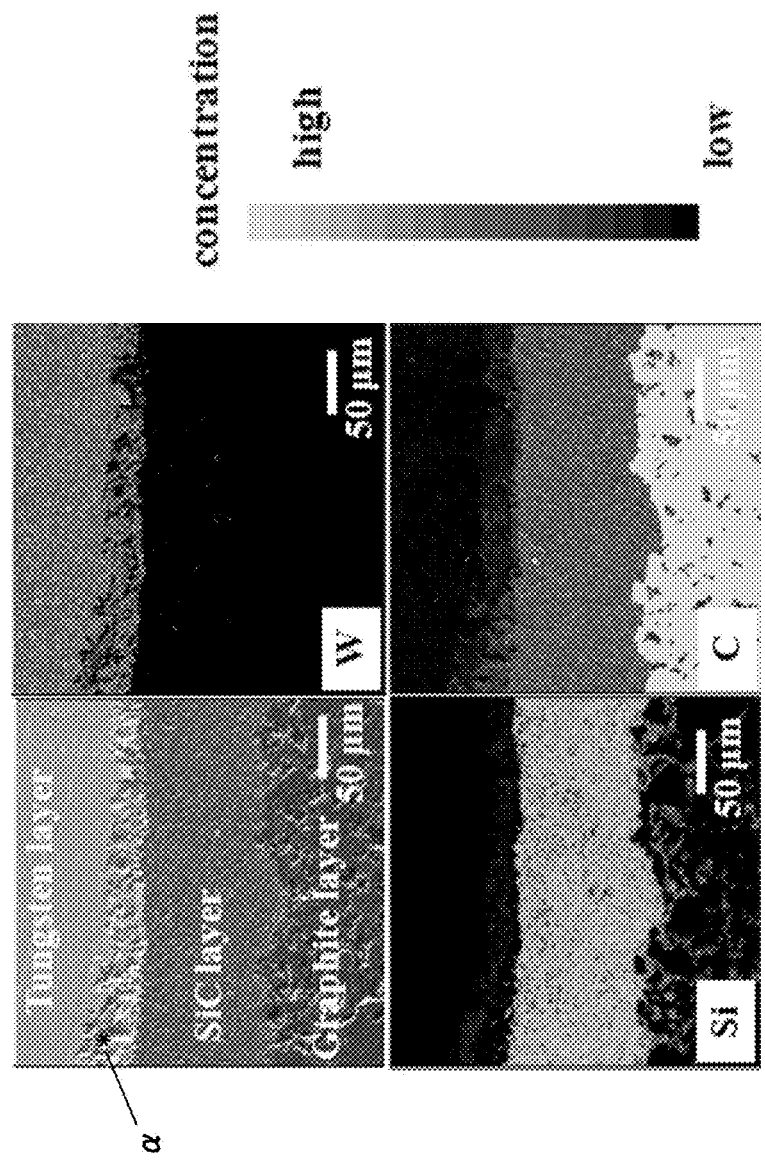
FIG. 6 shows photographs illustrating a cross-sectional SEM image of a joined material B1 and surface analysis results for elements W, Si, and C in the cross-sectional SEM image.
Figure 7:
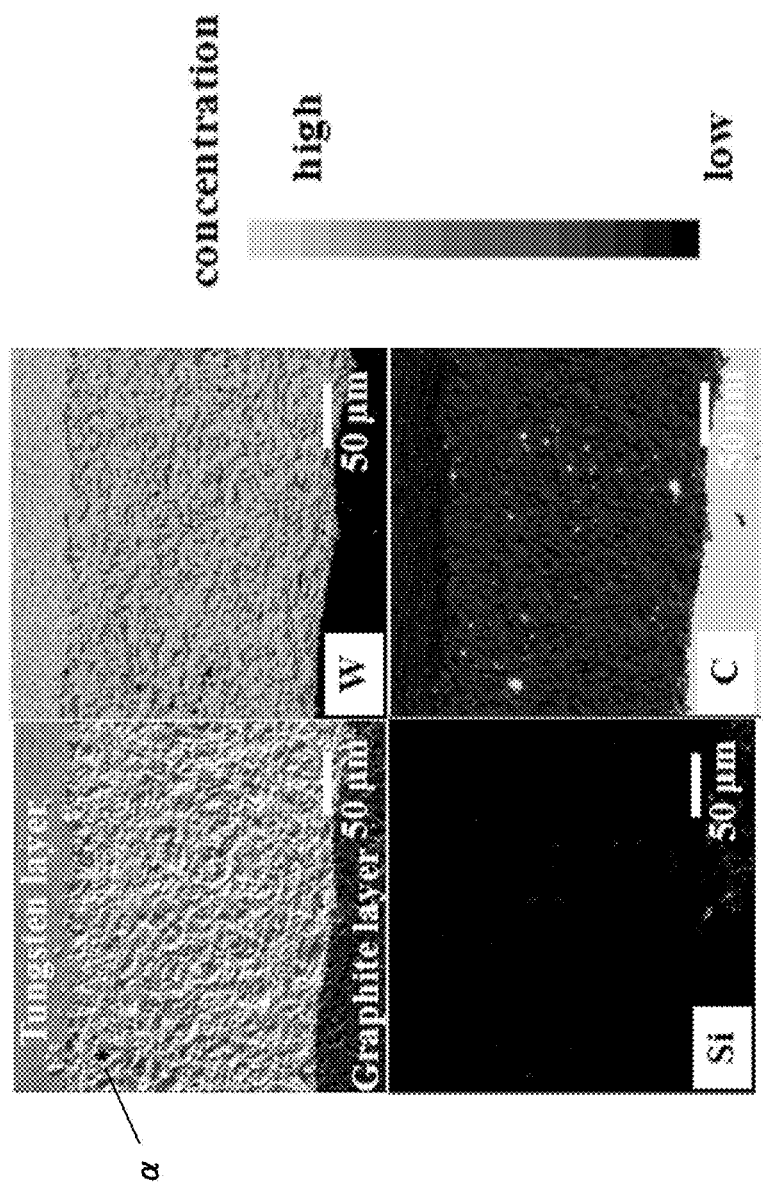
FIG. 7 shows photographs illustrating a cross-sectional SEM image of a joined material B3 and surface analysis results for elements W, Si, and C in the cross-sectional SEM image.

Cross-sectional SEM images of the joined materials B1 and B3 were taken, and surface analysis was made for the elements W, Si, and C in the cross-sectional SEM images. The results are shown in FIGS. 6 and 7. FIG. 6 shows SEM photographs, etc. of the joined material B1, and FIG. 7 shows SEM photographs, etc. of the joined material B3. It should be noted that point α in each of the cross-sectional SEM images of FIGS. 6 and 7 indicates the location at which a later-described XRD pattern is measured.

Figure 4:
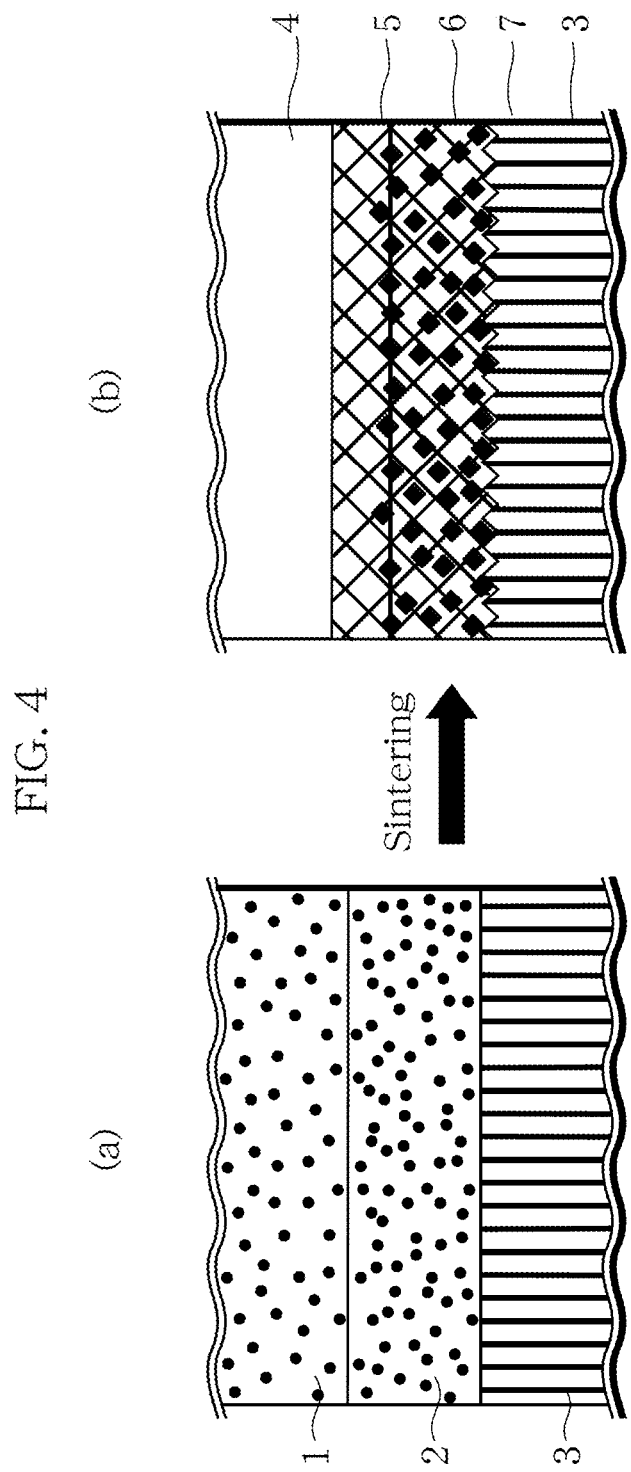

Referring to the cross-sectional SEM images shown in FIGS. 6 and 7, it is demonstrated that no cracks or voids are observed at the interfaces in both of the joined materials B1 and B3, and good joining conditions are obtained. Since the open pore rate of the isotropic graphite material is about 16% (see Example 1 of the second embodiment), the distribution of Si is observed in the isotropic graphite material of both of the joined materials B1 and B3. This indicates that SiC has been sintered while intruding into the isotropic graphite material, as in the cases of the foregoing joined materials A1 and A2. In the joined material B1, a mixed layer comprising W, Si, and C, as shown in FIG. 4, was observed between the tungsten layer and the joint layer comprising SiC as its main component. In the joined material B3, it is observed that the intermediate layer comprising SiC as its main component disappeared, and a wide joint layer containing W and C is formed between the tungsten layer and the isotropic graphite material. Also, in the joined material B3, it is observed that Si is present in the isotropic graphite material, although the amount thereof is smaller than that in the joined material B1. This indicates that the joining is made by the SiC that has been sintered while intruding into the isotropic graphite material. Furthermore, a small amount of C is observed in the tungsten layer, which indicates that carbon atoms diffused into the tungsten layer.

(Experiment 2)

Figure 8:
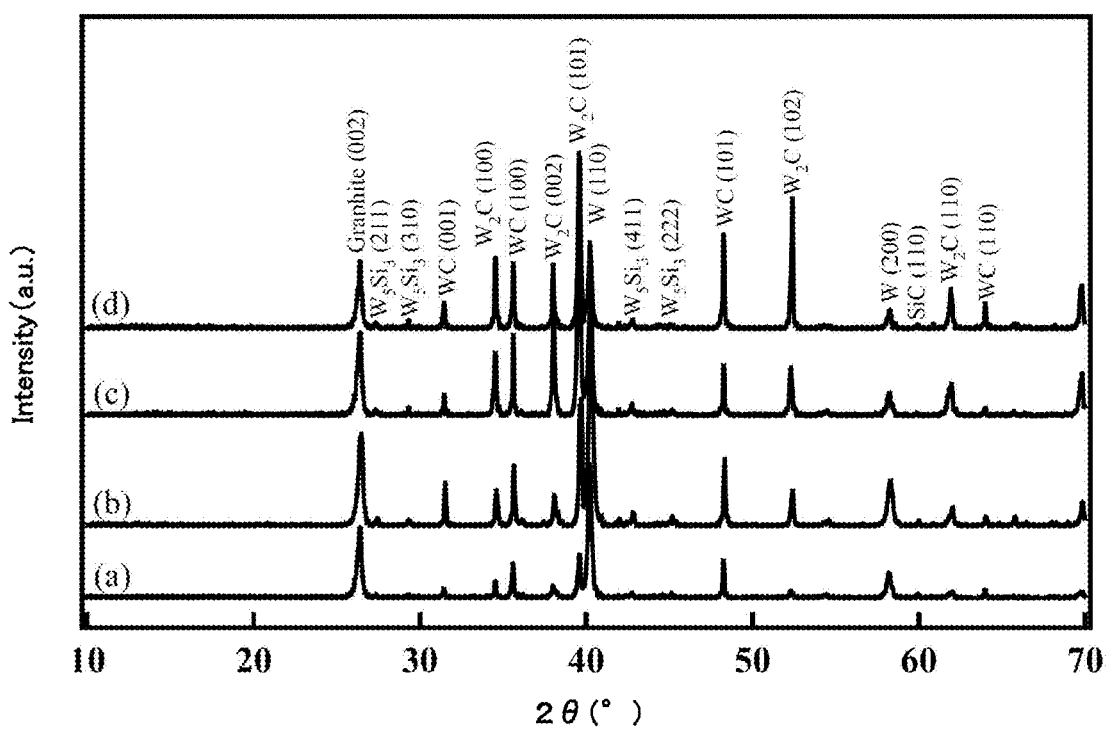
FIG. 8 is an X-ray diffraction chart for joined materials B1 to B4.

For the joined materials B1 to B4, an X-ray diffraction analysis using CuKα ray was conducted (the X-ray diffraction analyzer used was Ultima IV made by Rigaku Corp.). The results are shown in FIG. 8. The joined material B1 corresponds to FIG. 8(a), the joined material B2 corresponds to FIG. 8(b), the joined material B3 corresponds to FIG. 8(c), and the joined material B4 corresponds to FIG. 8(d). The analyzed points in the joined materials B1 and B3 are the points α in the cross-sectional SEM images of FIGS. 6 and 7. Regarding the joined materials B2 and B4 as well, the analysis was conducted for similar locations to those in the joined materials B1 and B3 (slightly downward in the tungsten layer).

From FIG. 8(a), it is understood that, in the joined material B1, a reaction phase containing $W_2C$, WC, and a small amount of $W_5Si_3$ is formed in the joint layer near the tungsten layer. It is observed that, in the joined material B3, almost no Si exists between the tungsten layer and the isotropic graphite material, in combination with the results shown in FIG. 7. The reason is believed to be that Si was volatilized due to the heating at 1900° C. in vacuum.

(Experiment 3)

For the joined materials B1 to B4, the joining strength between the tungsten layer and the isotropic graphite material was determined (the apparatus used was EZ-L made by Shimadzu Corp.). The results are shown in Table 2. The experiment was conducted in the following manner.

Each of the joined materials was cut into dimensions of 4 mm×4 mm×6 mm (6 mm along the stacking direction) with a diamond cutter, and a jig made of stainless steel was bonded to each of the upper and lower surfaces of the tungsten layer using an epoxy resin. Using the jigs, the joined material was pulled by a universal testing machine at 0.5 mm/min so that the tensile load is applied in the stacking direction. The maximum load was shown at the time of rupture. From the maximum load, the tensile strength was calculated. In addition, the location of rupture was confirmed by visual observation.

TABLE 2

| Joined material | Thickness of isotropic graphite material (mm) | Thickness of tungsten layer (mm) | Tensile strength (MPa) | Location of rupture |
|---|---|---|---|---|
| B1 | 4 | 1 | 21 | In isotropic graphite material near tungsten layer |
| B2 | 4 | 1 | 15 | In isotropic graphite material near tungsten layer |
| B3 | 4 | 1 | 13 | In isotropic graphite material near tungsten layer |
| B4 | 4 | 1 | 11 | In isotropic graphite material near tungsten layer |

For all the joined materials, the tensile strength exceeded 10 MPa, indicating that the isotropic graphite material and the tungsten layer were firmly joined to each other. Moreover, since the location of rupture was a location in the isotropic graphite material, it is believed that the joining strength of the joined portion was sufficient. The tensile strength of the used isotropic graphite material is about 28 MPa, so all the joined materials showed a lower tensile strength than that of the isotropic graphite material. Because the higher the temperature in joining was, the lower the tensile strength, it is believed that the tensile strength decreased due to the thermal stress caused during the joining.

Figure 9:
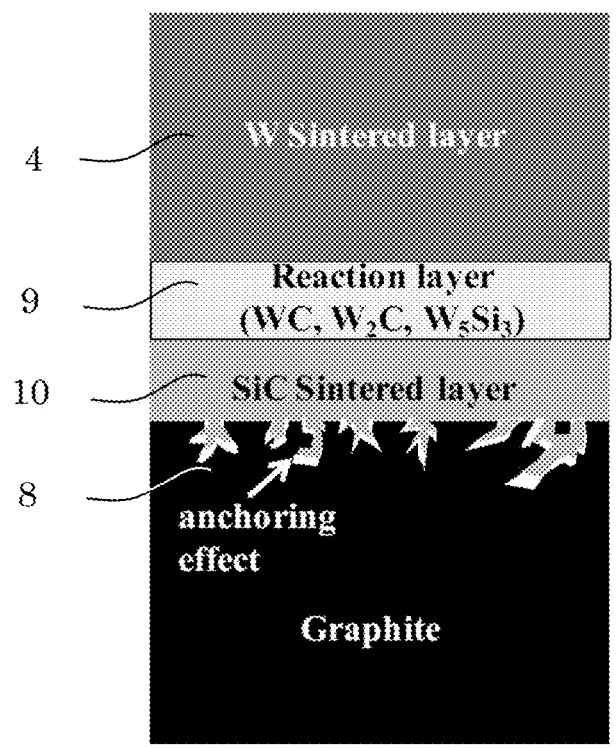
FIG. 9 is an illustrative view showing the joining mechanism of the joined materials B1 and B2.
Figure 10:
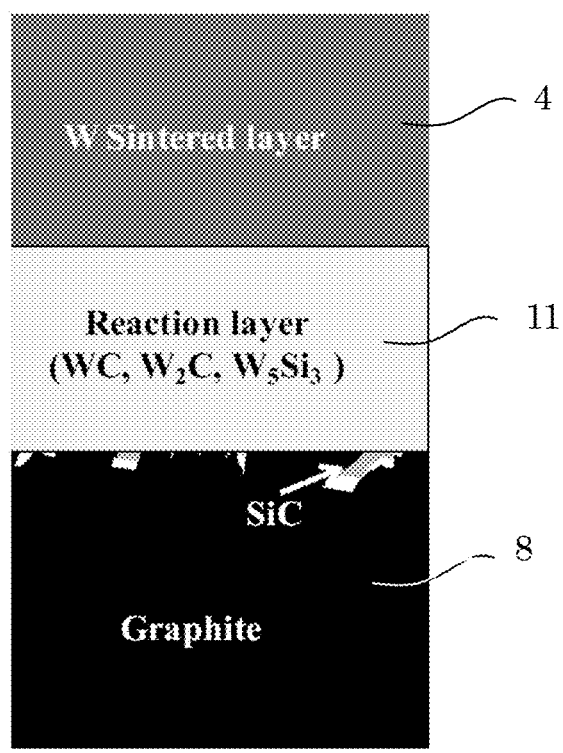
FIG. 10 is an illustrative view showing the joining mechanism of the joined materials B3 and B4.

For the above reasons, it is believed that the joining in the joined materials B1 through B4 is made by the mechanism as shown in FIGS. 9 and 10. FIG. 9 shows the believed joining mechanism in the joined materials B1 and B2, and FIG. 10 shows the believed joining mechanism in the joined materials B3 and B4. It is believed that two joint layers 9 and 10 exist in each of the joined materials B1 and B2, and that the joint layer 9 is joined to the tungsten layer 4 while the joint layer 10 is joined to the isotropic graphite material 8. On the other hand, it is believed that only one joint layer 11 exists in each of the joined materials B3 and B4, and that the joint layer 11 is joined to both the tungsten layer and the isotropic graphite material.

INDUSTRIAL APPLICABILITY

The present invention is applicable to, for example, a heat sink material, an aperture and a beam dumper equipped with a cooling mechanism for an electron beam thermal spraying apparatus, a divertor plate or a first wall of a nuclear fusion reactor, a rotating X-ray target, a heat dissipating member, and a heat-resistant member.

REFERENCE SIGNS LIST

1—Tungsten powder
2—SiC powder containing sintering aid agent
3—CFC layer
4—Tungsten layer
5—Sintered tungsten carbide layer
6—Mixed layer of SiC and WC (or intermediate layer containing elemental W, Si, and C)
7—Sintered SiC and WC intruding into CFC layer
8—Isotropic graphite material
9—Joint layer
10—Joint layer
11—Joint layer

The invention claimed is:

1. A joined material comprising a carbon material layer consisting essentially of a carbon fiber composite material and a metal layer comprising tungsten joined to each other, characterized in that:

a joint layer is formed between the carbon material layer and the metal layer, the joint layer consisting of a sintering aid agent and a ceramic; the ceramic consists of i) SiC and WC or ii) SiC, WC and the remainder consisting of at least one selected from the group consisting of AlN, TiC, ZrC, $B_4C$, TaC, and HfC; the sintering aid agent consists of at least one selected from the group consisting of $Y_2O_3$, $Al_2O_3$, $SiO_2$, $La_2O_3$, $CeO_2$, $Sm_2O_3$, $Yb_2O_3$, and $Lu_2O_3$; the carbon material layer, the joint layer, and the metal layer are joined to each other by sintering; and SiC and WC in the joint layer intrudes in a structure of the carbon material layer by compression during sintering so that the joining between the joint layer and the carbon material layer is mainly caused by a physical anchoring effect, wherein the SiC and the WC grow in a form of particles by the sintering, wherein a metal in the metal layer has a melting point of 1700 degree or higher.

2. The joined material according to claim 1, wherein the thickness of the joint layer is from 10 μm to 150 μm.

3. The joined material according to claim 1, wherein the joint layer intrudes by 5 μm or more into the structure of the carbon material layer at an interface between the carbon material layer and the joint layer.

4. The joined material according to claim 1, wherein the carbon fiber composite material in the carbon material layer contains an ash content of 20 ppm or less.

5. The joined material according to claim 1, for use as a divertor plate and/or a first wall of a nuclear fusion reactor.

* * * * *